(12) United States Patent
Stangas et al.

(10) Patent No.: US 12,173,818 B2
(45) Date of Patent: Dec. 24, 2024

(54) SYSTEMS AND METHODS FOR FLUID FITTING INSTALLATION

(71) Applicant: GM GLOBAL TECHNOLOGY OPERATIONS LLC, Detroit, MI (US)

(72) Inventors: Deanna Stangas, Royal Oak, MI (US); Marcus J Baker, Columbianville, MI (US); Ramesh Kavalur, Bangalore (IN); Jimmy Mickens, Sterling Heights, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 396 days.

(21) Appl. No.: 17/643,916

(22) Filed: Dec. 13, 2021

(65) Prior Publication Data

US 2023/0184355 A1   Jun. 15, 2023

(51) Int. Cl.
*F16L 19/025* (2006.01)
*F16L 49/04* (2006.01)

(52) U.S. Cl.
CPC ............ *F16L 19/025* (2013.01); *F16L 49/04* (2013.01)

(58) Field of Classification Search
CPC ......... B25B 27/10; B25B 27/02; B25B 7/123; Y10T 29/53657; Y10T 29/5367; Y10T 29/53678; B23P 11/00; B23P 11/005; B23P 19/00; B23P 19/04; F16L 19/025
USPC ......... 29/235, 238, 243.5, 243.55, 252, 270, 29/271
See application file for complete search history.

(56) References Cited

U.S. PATENT DOCUMENTS

| | | | | |
|---|---|---|---|---|
| 3,170,345 | A * | 2/1965 | Poingt | B25B 7/18 81/343 |
| 3,299,496 | A * | 1/1967 | Christensen | B25B 27/10 29/237 |
| 11,007,628 | B2 * | 5/2021 | Burgess | B25B 27/10 |
| 11,247,260 | B1 * | 2/2022 | Othman | B25B 27/10 |
| 2007/0099460 | A1 * | 5/2007 | Holp | B25B 27/10 439/157 |

* cited by examiner

*Primary Examiner* — Brian D Keller
*Assistant Examiner* — Sidney D Full
(74) *Attorney, Agent, or Firm* — Lorenz & Kopf LLP

(57) ABSTRACT

A fluid fitting installation system includes a first handle and a second handle movably coupled to the first handle. The second handle is movable between a first position and a second position. The fluid fitting installation system includes a grasping member coupled to the second handle. The grasping member is configured to be coupled to a first fluid fitting. A movement of the second handle from the first position to the second position is configured to couple the first fluid fitting to a second fluid fitting.

19 Claims, 8 Drawing Sheets

SYSTEMS AND METHODS FOR FLUID FITTING INSTALLATION

INTRODUCTION

The technical field generally relates to systems and methods for fluidly coupling fluid lines together, and more particularly relates to systems and methods for fluid fitting installation in which a first fluid fitting associated with a fluid line is installed onto a second fluid fitting in areas of reduced clearance.

During assembly, in certain instances, one or more fluid fittings may need to be coupled together to provide fluid communication between components. In the example of a vehicle, during assembly a fluid fitting associated with a fluid line, such as a coolant line, may need to be coupled to another fluid fitting to fluidly couple fluid lines together. For example, in the instance of a battery powered vehicle, a spigot of a coolant line is coupled to a quick connect fitting associated with a coolant line of a battery pack to supply coolant to the battery pack. Due to the packaging of the battery pack within the vehicle, the quick connect fitting may be hard to reach by an operator during assembly, and it may be difficult for the operator to install the spigot on the quick connect fitting to enable fluid communication.

Thus, it is desirable to provide systems and methods for fluid fitting installation, which enables an operator to install a fluid fitting, such as a spigot associated with a fluid line to another fluid fitting, such as a quick connect fitting, to enable fluid communication in areas of reduced clearance. Furthermore, other desirable features and characteristics of the present invention will become apparent from the subsequent detailed description and the appended claims, taken in conjunction with the accompanying drawings and the foregoing technical field and background.

SUMMARY

According to various embodiments, provided is a fluid fitting installation system. The fluid fitting installation system includes a first handle and a second handle movably coupled to the first handle. The second handle is movable between a first position and a second position. The fluid fitting installation system includes a grasping member coupled to the second handle. The grasping member is configured to be coupled to a first fluid fitting. A movement of the second handle from the first position to the second position is configured to couple the first fluid fitting to a second fluid fitting.

The first handle includes a body having a first end opposite a second end, a first flange at the first end and a second flange between the first end and the second end, with the second handle movably coupled to the second flange. The second end defines a recess configured to be received on a fluid line. The second flange defines at least one bore, and the second handle includes at least one leg, and the at least one leg is received within the at least one bore to movably couple the second handle to the first handle. The fluid fitting installation system includes a biasing member disposed between the first handle and the second handle. Each of the first handle and the second handle includes a post to guide the biasing member. The biasing member is configured to move the second handle from the second position to the first position. The grasping member includes a grasping base coupled to a grasping arm, and the grasping base is coupled to the second handle to move with the second handle. The grasping arm includes a receiving structure configured to be positioned about the first fluid fitting. The grasping arm is coupled to the grasping base such that the grasping arm is offset from a longitudinal axis of the fluid fitting installation system.

Further provided is a method for installing a first fluid fitting on a second fluid fitting. The method includes positioning a fluid fitting installation system in a first state adjacent to a fluid line including the second fluid fitting, and engaging a claw of the fluid fitting installation system with the first fluid fitting. The method includes moving the fluid fitting installation system from the first state to a second state to couple the first fluid fitting to the second fluid fitting.

The moving the fluid fitting installation system from the first state to the second state includes moving a second handle of the fluid fitting installation system relative to a first handle of the fluid fitting installation system to move the fluid fitting installation system from the first state to the second state. The method includes returning the fluid fitting installation system to the first state by releasing the second handle. The engaging the claw of the fluid fitting installation system with the first fluid fitting includes positioning a grasping member of the fluid fitting installation system about a portion of a perimeter of the first fluid fitting.

Also provided is a fluid fitting installation system. The fluid fitting installation system includes a first handle having a first flange and a second flange. The fluid fitting installation system includes a second handle movably coupled to the second flange of the first handle. The second handle is movable relative to the first handle between a first position and a second position. The fluid fitting installation system includes a grasping member coupled to the second handle. The grasping member includes a grasping arm configured to be coupled to a first fluid fitting, and the grasping arm extends along an axis offset from a longitudinal axis of the fluid fitting installation system. A movement of the second handle from the first position to the second position is configured to couple the first fluid fitting to a second fluid fitting.

The second flange defines at least one bore, the second handle includes at least one leg, and the at least one leg is received within the at least one bore to movably couple the second handle to the first handle. The fluid fitting installation system includes a biasing member disposed between the first handle and the second handle, and each of the first handle and the second handle includes a post to guide the biasing member. The biasing member is configured to move the second handle from the second position to the first position. The grasping member includes a grasping base coupled to the grasping arm, and the grasping base is coupled to the second handle to move with the second handle. The grasping arm includes a receiving structure configured to be positioned about the first fluid fitting.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding introduction, brief summary or the following detailed description. In addition, those skilled in the art will appreciate that embodiments of the present disclosure may be practiced in conjunction with any number of systems, and that the system described herein is merely an exemplary embodiment of the present disclosure. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. Also, as used herein, the term "about" denotes within 5% to account for manufacturing tolerances.

Figure 1:
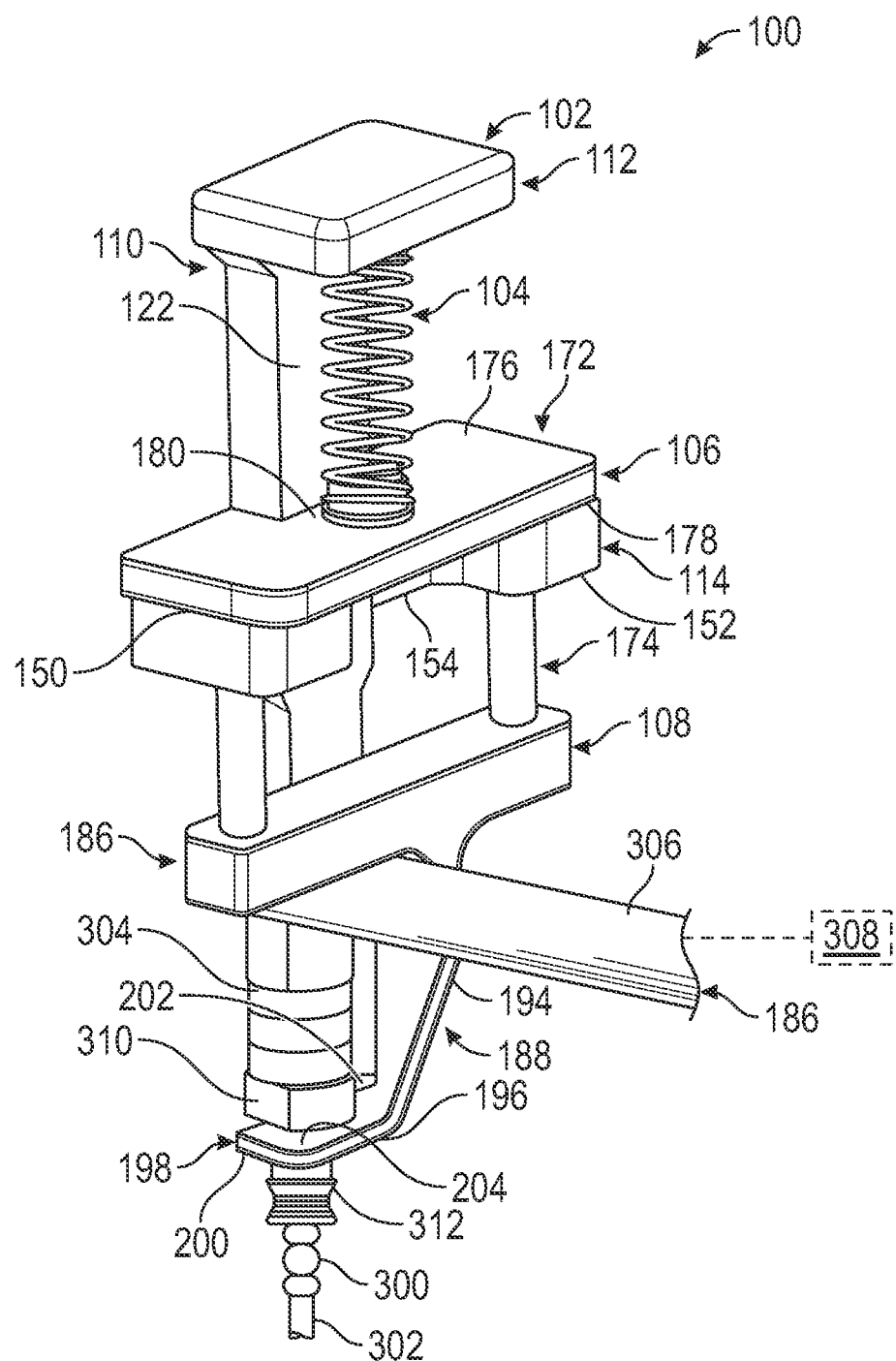
FIG. 1 is a perspective view of an exemplary fluid fitting installation system in accordance with various embodiments, in which the fluid fitting installation system is in a first state and a first fluid fitting is fluidly coupled to a second fluid fitting.

With reference to FIG. 1, an exemplary fluid fitting installation tool or system 100 is shown. As will be discussed, the fluid fitting installation system 100 may be employed to couple a first fluid fitting, such as a spigot 300, associated with a fluid line 302, such as a coolant line, to a second fluid fitting, such as a quick connect fitting 304 of a component fluid line 306 of a component 308, such as a coolant line of a battery pack associated with a vehicle. By coupling the spigot 300 to the quick connect fitting 304, fluid communication between the fluid line 302 and the component fluid line 306 is enabled securely in areas of reduced clearance. Generally, the fluid fitting installation system 100 enables the coupling or installation of the spigot 300 onto the quick connect fitting 304 in areas where the clearance is less than about 5 millimeters (mm). By providing the fluid fitting installation system 100, the operator is able to securely couple the spigot 300 to the quick connect fitting 304 easily, which reduces a likelihood of fluid leaks between the spigot 300 and the quick connect fitting 304. It should be noted that while the example of the spigot 300 for a coolant line and the quick connect fitting 304 for a coolant line of a battery pack is described herein, the fluid fitting installation system 100 may be used with any fluid system for coupling a first fluid fitting to a second fluid fitting in areas of reduced clearance. Thus, the installation of the spigot 300 associated with the cooling line and the quick connect fitting 304 associated with the coolant line of the battery pack discussed herein is merely an example.

Figure 2:
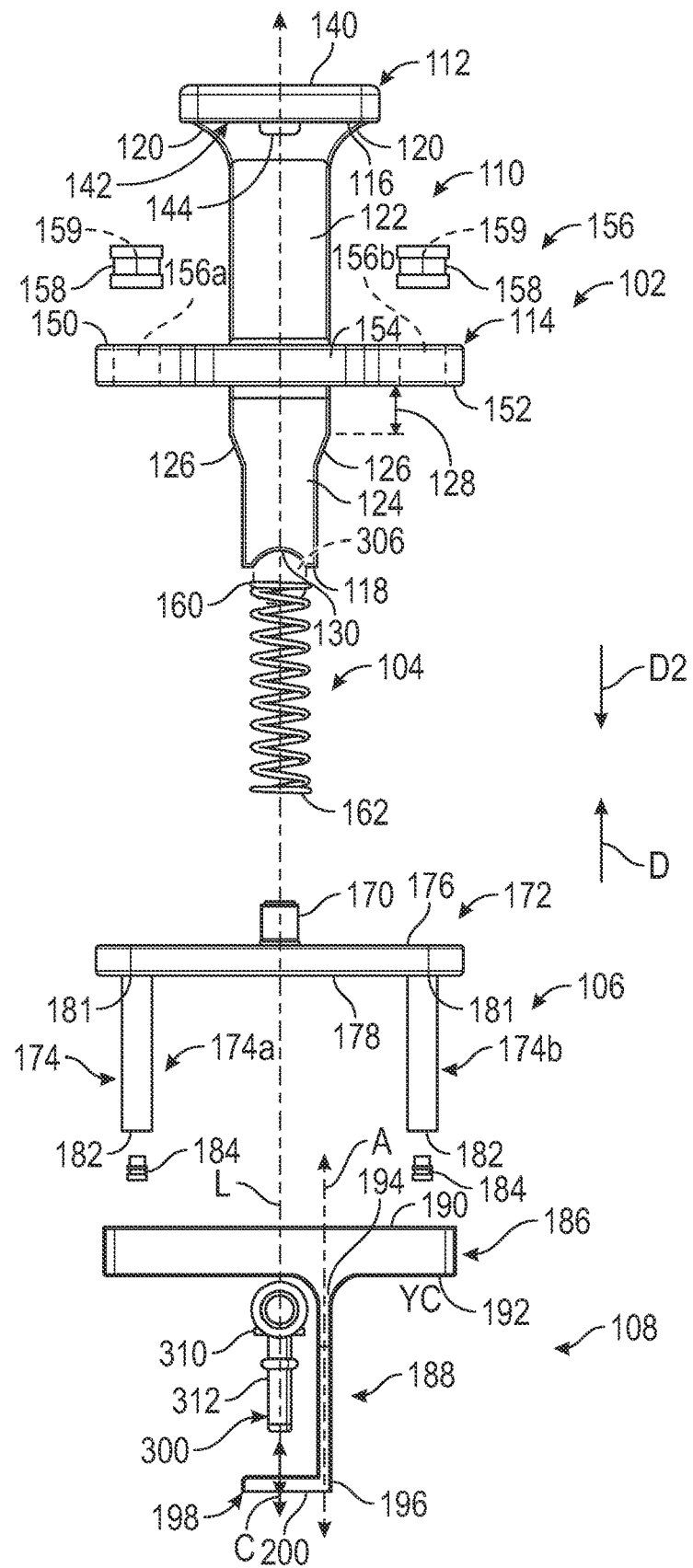
FIG. 2 is an exploded front view of the fluid fitting installation system of FIG. 1.

With reference to FIG. 2, the fluid fitting installation system 100 includes a first, fixed handle 102, a biasing member or spring 104, a second, movable handle 106 and a grasping member 108. In one example, the first handle 102 is composed of a polymer based material, including, but not limited to polyamide 12. In this example, the first handle 102 is manufactured as one-piece using additive manufacturing, such as multi jet fusion, however, other manufacturing techniques may be employed, such as casting, extruding, molding, etc. For this example, by composing the first handle 102 out of the polymer based material, the first handle 102 is non-conductive, which is desirable for some manufacturing operations. It should be noted, however, that while the first handle 102 is described herein as being composed of a polymer based material, the first handle 102 may also be composed of a metal or a metal alloy, and manufactured through additive manufacturing, such as through direct metal laser sintering (DMLS), for example, depending upon the manufacturing operation for which the fluid fitting installation system 100 is used.

The first handle 102 includes a body 110, a first flange 112 and a second flange 114. Generally, the first handle 102 is shaped to be ergonomic and to provide comfort to the operator during use. The body 110 has a first body end 116 opposite a second body end 118, and extends along a longitudinal axis L of the fluid fitting installation system 100. The first flange 112 is coupled to the first body end 116. In one example, the body 110 includes a taper 120 on opposed sides proximate the first body end 116 such that the first body end 116 has a width that is different and greater than a forward section 122 of the body 110 defined between the first body end 116 and the second flange 114. The forward section 122 of the body 110 extends from the taper 120 proximate the first body end 116 to the second flange 114. The forward section 122 is substantially rectangular with a substantially constant width; however, the shape and the width of the forward section 122 may vary. The body 110 also includes an aft section 124 defined from the second flange 114 to the second body end 118. In one example, the aft section 124 includes a second taper 126 on opposed sides defined a distance 128 from the second flange 114. The distance 128 is predetermined based on a clearance available for the second body end 118. The aft section 124 is substantially rectangular, and has a first width proximate the second flange 114 that is different and greater than a second width of the aft section 124 at and proximate the second body end 118. The second body end 118 includes a recess 130. In this example, the recess 130 is concave, and is shaped to correspond to the component fluid line 306 (FIG. 1). The recess 130 enables the fluid fitting installation system 100 to be positioned over the component fluid line 306 (FIG. 1) for coupling the spigot 300 to the quick connect fitting 304 (FIG. 1). It should be noted that the second body end 118 may have any shape to correspond to the component fluid line 306, and thus, the concave shape of the recess 130 is merely an example.

The first flange 112 is coupled to or integrally formed with the first body end 116. The first flange 112 extends along an axis that is substantially perpendicular to the longitudinal axis L. The first flange 112 includes a first surface 140 opposite a second surface 142. The first surface 140 is substantially rectangular, and is smooth (FIG. 1). The first surface 140 provides a contact surface for a portion of an operator's hand, such as a palm of the operator's hand. The second surface 142 overhangs the body 110 (FIG. 1), and includes a post 144. The post 144 assists in coupling the spring 104 to the first handle 102, and also maintains an alignment of the spring 104 relative to the first handle 102 during compression and expansion of the spring 104. A circular or annular recess 144a (FIG. 3) may be defined about the post 144 to assist in coupling the spring 104 to the post 144.

The second flange 114 is coupled to or integrally formed with the body 110 so as to be positioned between the forward section 122 and the aft section 124. The second flange 114 extends along an axis substantially perpendicular to the longitudinal axis L. The second flange 114 includes a first flange surface 150, a second flange surface 152 opposite the first flange surface 150, a notch 154 and at least one bore 156. The first flange surface 150 is substantially smooth to enable a portion of the second handle 106 to rest on the first flange surface 150 when the fluid fitting installation system 100 is in a first state. The second flange surface 152 is also substantially smooth, and provides a stop for a movement of the second handle 106 and the grasping member 108, as will be discussed. The contact between the second flange surface 152 and the grasping member 108 may also provide tactile and audible feedback to the operator. The notch 154 is defined through the second flange 114 so as to be opposite the body 110, and provides clearance for the operator's hand to manipulate the second handle 106.

Figure 3:
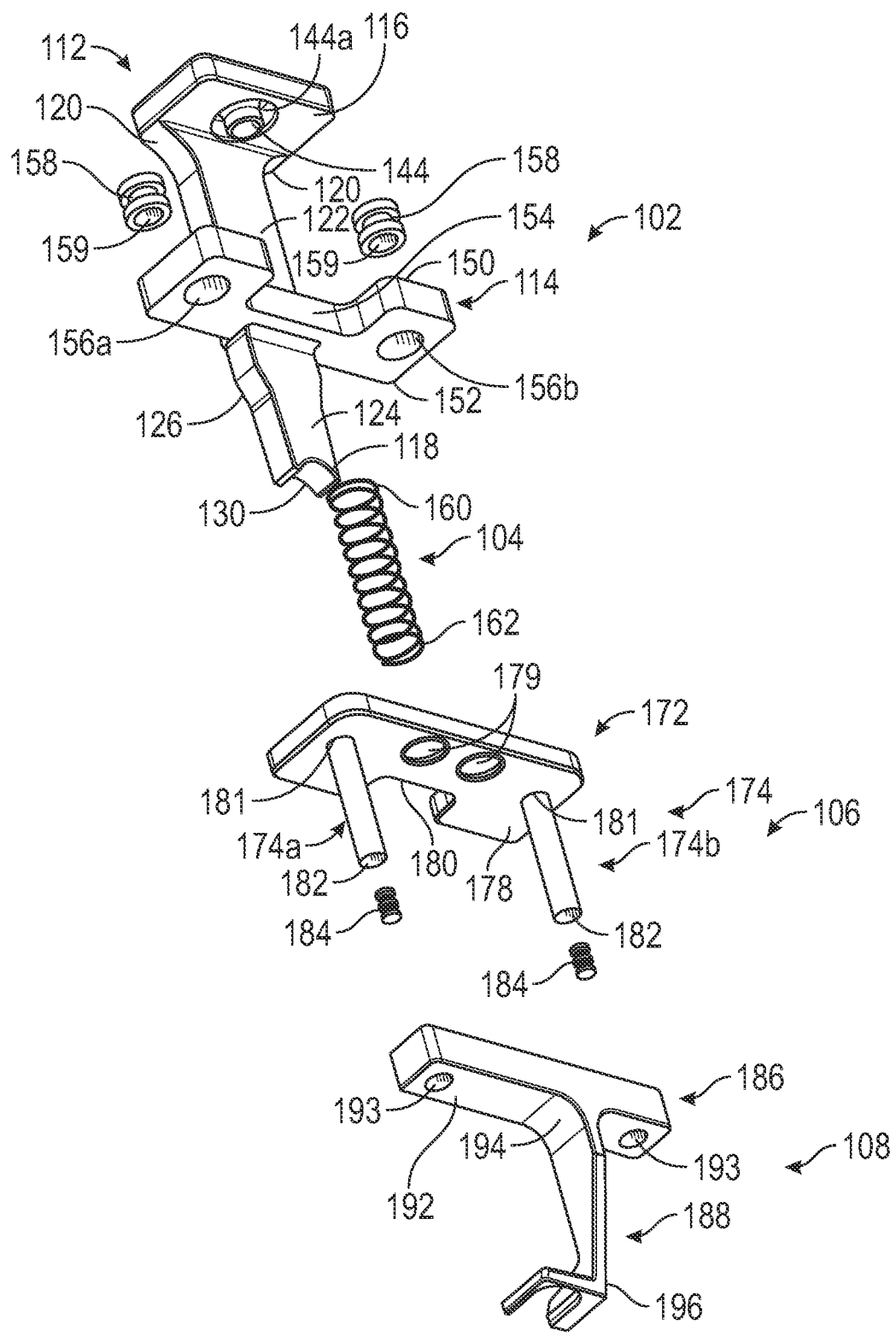
FIG. 3 is an exploded perspective view of the fluid fitting installation system of FIG. 1.

In this example, with reference to FIG. 3, the at least one bore 156 comprises two bores 156a, 156b. The bore 156a is defined through the second flange 114 so as to be opposite the bore 156b. The bores 156a, 156b are defined on opposite sides of the notch 154. The bores 156a, 156b are defined through the second flange 114 from the first flange surface 150 to the second flange surface 152, and extend along an axis substantially parallel to the longitudinal axis L (FIG. 2). Each of the bores 156a, 156b includes a bushing 158. The bushing 158 provides for smooth movement of the second handle 106 relative to the first handle 102. The bushings 158 are cylindrical, and may be coupled to the respective bore 156a, 156b via drilling, for example. It should be noted that the bushings 158 may be optional, and further, that the bushings 158 may be coupled to the second flange 114 via any technique such as adhesives, press-fit, etc. Each of the bushings 158 defines an opening 159. As will be discussed, a portion of the second handle 106 is slidably received within the bushings 158, and the bores 156a, 156b, to enable the second handle 106 and the grasping member 108 to move relative to the first handle 102 to install the spigot 300 on the quick connect fitting 304 (FIG. 1).

With reference to FIG. 2, the spring 104 is coupled between the first handle 102 and the second handle 106. The spring 104 is a compression spring, and in one example, has a 34.6 pound per inch (lb./in.) compression rate. The spring 104 has a first spring end 160 opposite a second spring end 162, and a spring length defined between the first spring end 160 and the second spring end 162 of about 2.5 inches. In one example, the spring 104 has an inner diameter of about 0.55 inches (in.) and an outer diameter of about 0.72 inches (in.). It should be noted that the dimensions and compression rate of the spring 104 are merely an example, and that the spring 104 may have different dimensions and a different compression rate depending upon the manufacturing operation. The first spring end 160 is coupled about the post 144 of the first handle 102, and the second spring end 162 is coupled about a second post 170 of the second handle 106.

The second handle 106 is coupled to the grasping member 108, and is movably coupled to the first handle 102. In one example, the second handle 106 is composed of a polymer based material, including, but not limited to polyamide 12. In this example, the second handle 106 is manufactured as one-piece using additive manufacturing, such as multi jet fusion, however, other manufacturing techniques may be employed, such as casting, extruding, molding, etc. For this example, by composing the second handle 106 out of the polymer based material, the second handle 106 is non-conductive, which is desirable for some manufacturing operations. It should be noted, however, that while the second handle 106 is described herein as being composed of a polymer based material, the second handle 106 may also be composed of a metal or a metal alloy, and manufactured through additive manufacturing, such as through direct metal laser sintering (DMLS), for example, depending upon the manufacturing operation for which the fluid fitting installation system 100 is used.

Figure 7:
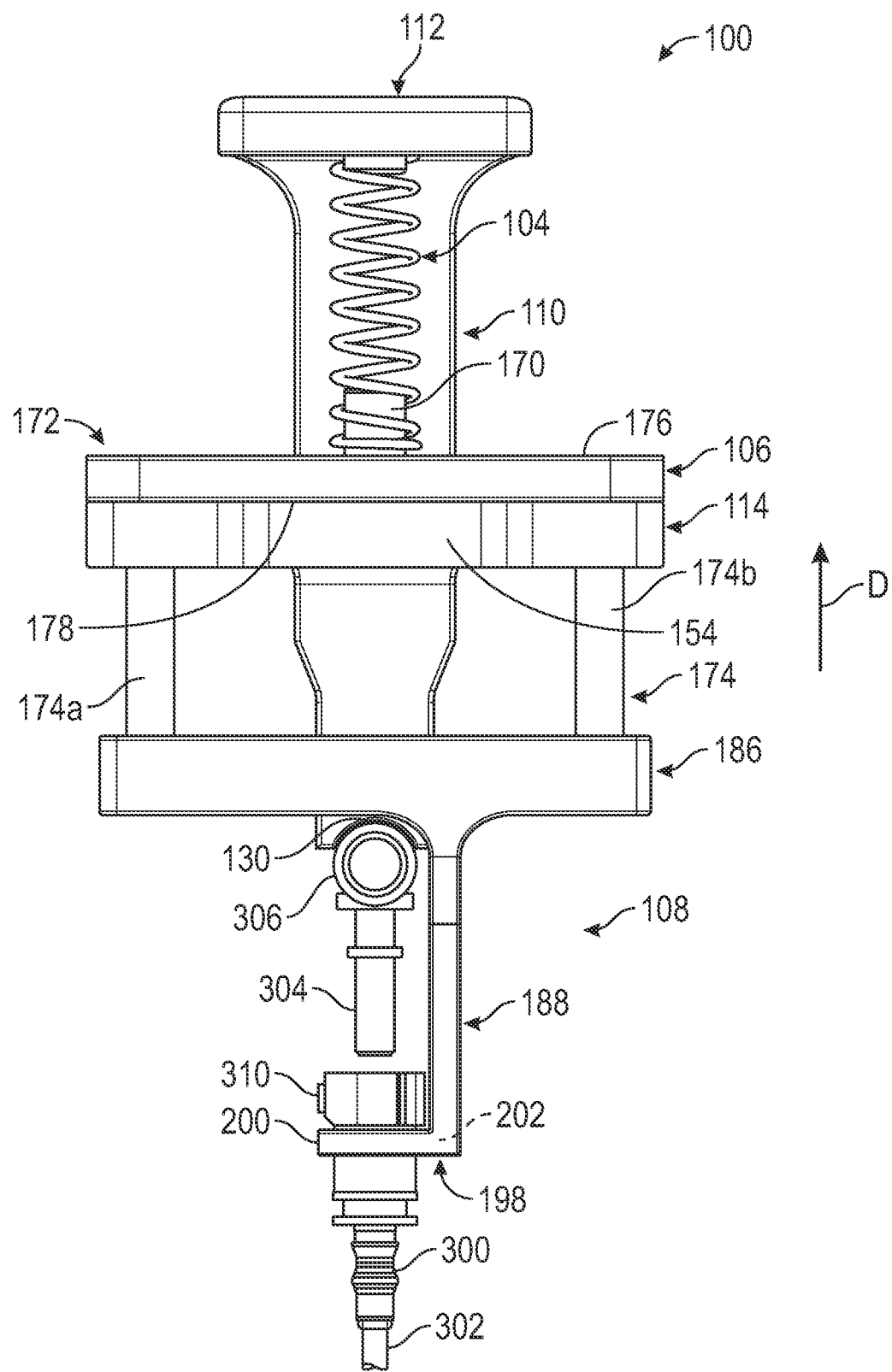
FIG. 7 is a schematic front view of the fluid fitting installation system in the first state and coupled to the first fluid fitting for coupling the first fluid fitting to the second fluid fitting.
Figure 8:
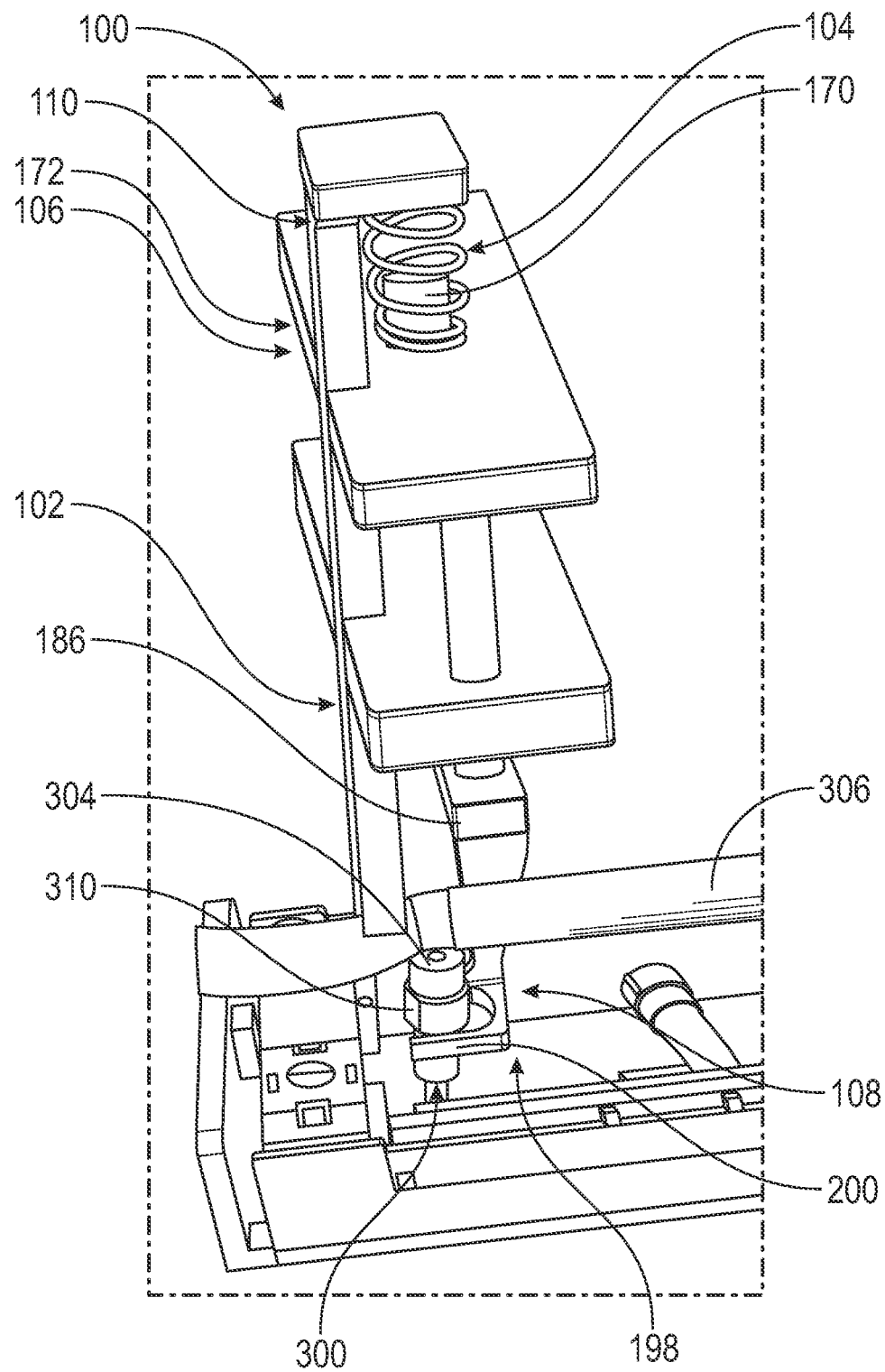
FIG. 8 is a schematic environmental illustration of the fluid fitting installation system in a second state and the first fluid fitting coupled to or installed onto the second fluid fitting.

The second handle 106 includes a handle body 172 and at least one handle leg 174. The handle body 172 extends along an axis substantially perpendicular to the longitudinal axis L. The handle body 172 includes a first handle surface 176 opposite a second handle surface 178, and a guide notch 180 (FIG. 1). The first handle surface 176 includes the second post 170. The second post 170 projects outwardly from the first handle surface 176. The second post 170 assists in retaining the spring 104 between the first handle 102 and the second handle 106, and guides a movement of the spring 104 during the movement of the second handle 106. Generally, as will be discussed, the second handle 106 is movable away from the second flange 114 toward the first flange 112 of the first handle 102 in a direction D to compress the spring 104 until the grasping member 108 contacts the second flange surface 152 of the second flange 114. The second handle 106 is in a first position in FIGS. 1 and 7, and is in a second position in FIG. 9. Once the second handle 106 is released, the spring 104 moves the second handle 106 in a direction D2 to the first position such that the second handle surface 178 rests against the first flange surface 150. Stated another way, the spring 104 biases the second handle 106 in the first position. With reference to FIG. 3, the second handle surface 178 includes two raised locating features or locating ribs 179, which assist the operator in positioning their fingers on the second handle 106. In this example, the locating ribs 179 are circles, which provide tactile feedback to the operator of the place to position their figures to move the second handle 106. It should be noted that in other examples, the second handle surface 178 may comprise knurling, bumps, or other features to indicate to the operator a position for the operator's fingers. Alternatively, the second handle surface 178 may be smooth. The second handle surface 178 contacts the first flange surface 150 of the second flange 114 when the fluid fitting installation system 100 is in the first state (FIG. 7). In a second state of the fluid fitting installation system 100 (FIG. 9), the second handle surface 178 is spaced a distance apart from the first flange surface 150 of the second flange 114. Thus, the second handle 106 has the first position in the first state of the fluid fitting installation system 100, and the second handle 106 has a second position in the second state of the fluid fitting installation system 100.

With reference back to FIG. 1, the guide notch 180 is substantially U-shaped, and is sized to enable the second handle 106 to fit around the forward section 122 of the body 110. Generally, the guide notch 180 is slidably coupled to the forward section 122 such that the movement of the second handle 106 relative to the first handle 102 is guided by the body 110. This ensures that the movement of the second handle 106 is linear or in the direction D, which is substantially parallel to the longitudinal axis L.

With reference back to FIG. 2, in this example, the at least one handle leg 174 comprises two handle legs 174a, 174b. Each of the handle legs 174a, 174b has a first leg end 181 opposite a second leg end 182. The first leg end 181 is coupled to or integrally formed with the second handle surface 178 and extends outward from the second handle surface 178 along an axis substantially parallel with the longitudinal axis L. The second leg end 182 is coupled to the grasping member 108 such that the grasping member 108 moves with the second handle 106. In one example, a heat set insert 184 is used to couple each of the second leg ends 182 to the grasping member 108. In this example, the heat set inserts 184 are each commercially available from McMaster-Carr Supply Company of Elmhurst, Ill., USA, and each comprise tapered heat-set inserts for plastic, part number 94180A353. It should be noted, however, that other heat-set inserts for polymer-based materials may be employed, and the use of this particular insert is merely an example. It should also be noted that the second leg ends 182 may be fixedly coupled to the grasping member 108, such that the grasping member 108 moves with the second handle 106 via any technique, including, but not limited to thermoplastic welding, ultrasonic welding, adhesives, etc.

The grasping member 108 couples the spigot 300 to the fluid fitting installation system 100. In one example, the grasping member 108 is composed of a polymer based material, including, but not limited to polyamide 12. In this example, the grasping member 108 is manufactured as one-piece using additive manufacturing, such as multi jet fusion, however, other manufacturing techniques may be employed, such as casting, extruding, molding, etc. For this example, by composing the grasping member 108 out of the polymer based material, the grasping member 108 is non-conductive, which is desirable for some manufacturing operations. It should be noted, however, that while the grasping member 108 is described herein as being composed of a polymer based material, the grasping member 108 may also be composed of a metal or a metal alloy, and manufactured through additive manufacturing, such as through direct metal laser sintering (DMLS), for example, depending upon the manufacturing operation for which the fluid fitting installation system 100 is used.

Figure 4:
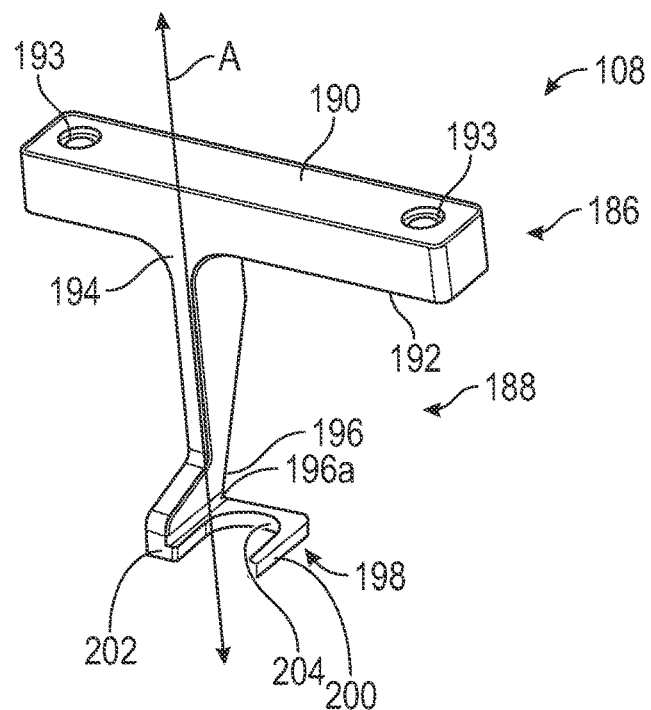
FIG. 4 is a perspective view of a grasping member of the fluid fitting installation system of FIG. 1.

In one example, the grasping member 108 includes a grasping base 186 and a grasping arm 188. The grasping base 186 includes a first grasping surface 190 and an opposite second grasping surface 192. The first grasping surface 190 is fixedly coupled to each of the second leg ends 182 of the second handle 106 to couple the second handle 106 to the grasping member 108. In one example, with reference to FIG. 3, the grasping base 186 defines bores 193, which are defined through the grasping base 186 from the first grasping surface 190 to the second grasping surface 192. The bores 193 each receive a respective one of the heat set inserts 184 to couple the respective one of the handle legs 174a, 174b of the second handle 106 to the grasping base 186. The second grasping surface 192 is coupled to or integrally formed with the grasping arm 188. The grasping arm 188 has a first arm end 194 coupled to the second grasping surface 192 and an opposite second arm end 196. The grasping arm 188 is generally sized to enable the grasping arm 188 to be positioned next to or adjacent to the component fluid line 306 (FIG. 1) when the grasping member 108 is coupled to the spigot 300. In one example, with reference back to FIG. 2, the grasping arm 188 extends outwardly from the second grasping surface 192 along an axis A, which is substantially parallel to but offset from the longitudinal axis L of the fluid fitting installation system 100. Stated another way, the grasping arm 188 is coupled or integrally formed with the grasping base 186 so as to be offset from the longitudinal axis L. This enables the grasping arm 188 to be positioned next to the component fluid line 306 (FIG. 1) to engage the spigot 300 during use. With reference to FIG. 4, the grasping member 108 is shown in greater detail. As shown, the second arm end 196 includes a receiving structure, such as a claw 198. In this example, the claw 198 is substantially U-shaped, and is sized to be positioned about the spigot 300 to couple the spigot 300 to the fluid fitting installation system 100. The claw 198 is coupled to a side 196a of the second arm end 196 so as to extend radially outward from the grasping arm 188.

Generally, the claw 198 includes a first claw arm 200, a second claw arm 202 and defines an opening 204 between the first claw arm 200 and the second claw arm 202. With reference to FIG. 1, the opening 204 has a diameter, which is less than a diameter of a portion of the spigot 300. The claw 198 extends radially outward from the grasping arm 188 such that an axis C of the opening 204 is substantially coaxially aligned with the longitudinal axis L of the fluid fitting installation system 100. In this example, the spigot 300 has a collar 310, which has a diameter that is different and greater than a diameter of the opening 204. An aft portion 312 of the spigot 300 has a diameter, which is less than the diameter of the collar 310. The different diameters of the spigot 300 enable the claw 198 to be positioned about the spigot 300 such that a portion of the spigot 300 is positioned within the opening 204. The first claw arm 200 and the second claw arm 202 are sized such that the first claw arm 200 and the second claw arm 202 contact the collar 310 of the spigot 300 when the claw 198 is positioned about the spigot 300. As will be discussed, the contact between the first claw arm 200, the second claw arm 202 and the collar 310 enables the movement of the second handle 106 to lift the spigot 300 into engagement with the quick connect fitting 304. It should be noted that the grasping member 108 may have any structure at the second arm end 196 that is configured to mate with shape of the spigot 300, and thus, the shape of the claw 198 is merely an example.

In one example, with reference back to FIG. 2, in order to assemble the fluid fitting installation system 100, with the first handle 102, the second handle 106 and the grasping member 108 formed, the bushings 158 are coupled to the bores 156a, 156b of the second flange 114. The second handle 106 is coupled to the first handle 102 by inserting the handle legs 174a, 17b through the openings 159 defined by the bushings 158 coupled to the second flange 114 of the first handle 102. The heat set inserts 184 are used to couple the grasping member 108 to the second handle 106. Generally, the heat set inserts 184 are each heated to a predetermined temperature, such as about 100 degrees Celsius, and inserted into the grasping member 108. The temperature of the heat set inserts 184 causes the grasping member 108 to melt around the heat set insert 184, which couples the heat set inserts 184 to the grasping member 108 when the grasping member 108 cools. While the heat set inserts 184 are still at a temperature proximate the predetermined temperature, the second leg end 182 is coupled to the respective heat set insert 184. The temperature of the heat set inserts 184 causes the respective second leg end 182 to melt and fixedly couple the second handle 106 to the heat set inserts 184 and the grasping member 108. In one example, the heat set inserts 184 may be heated by a soldering tip that reaches a temperature of 350 degrees Celsius, however, any technique may be used to heat the heat set inserts 184 to the predetermined temperature that enables the polymer based material of the second handle 106 and the grasping member 108 to melt to couple the grasping member 108 to the second handle 106 via the heat set inserts 184. With the grasping member 108 coupled to the second handle 106, and the second handle 106 movably coupled to the first handle 102, the spring 104 is inserted between the first handle 102 and the second handle 106. The spring 104 is inserted by compressing the spring 104, and positioning the first spring end 160 about the post 144 and the second spring end 162 about the second post 170.

Figure 5:
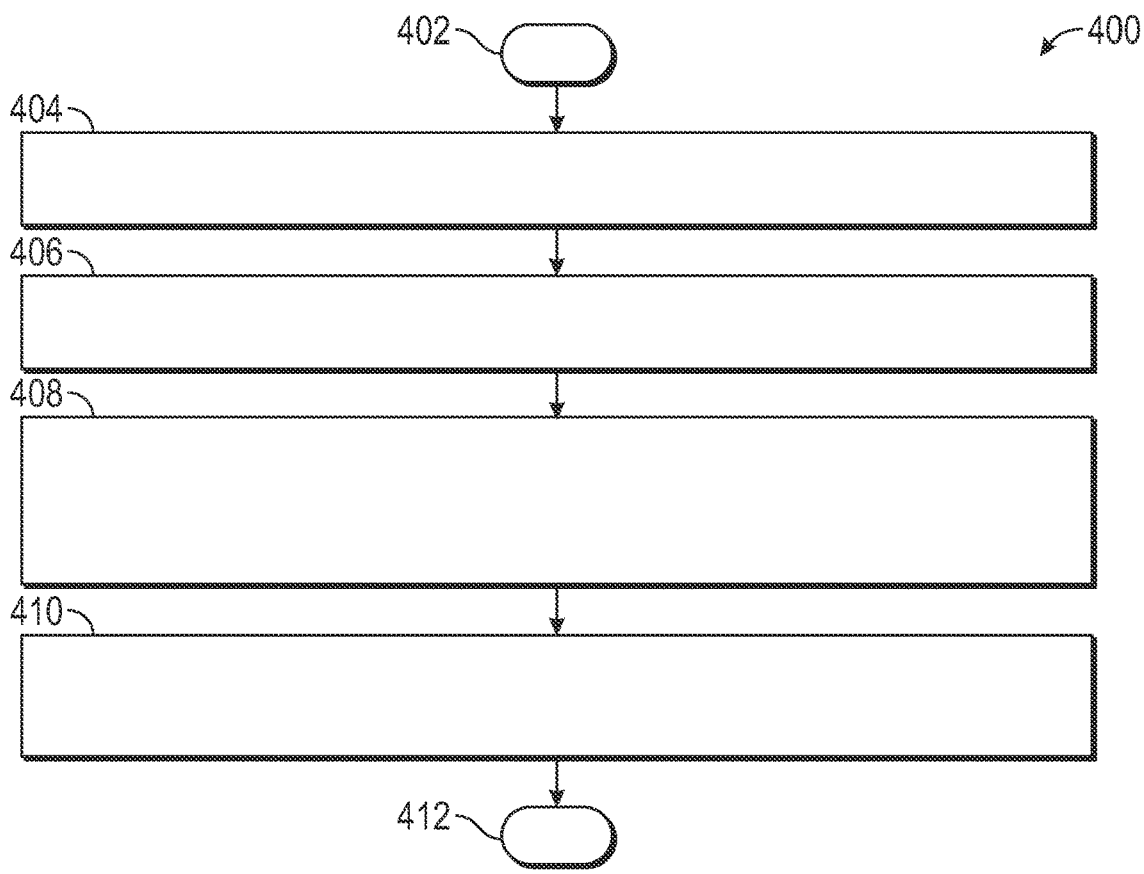
FIG. 5 is a flowchart illustrating a method that may be performed with the fluid fitting installation system in accordance with various embodiments.
Figure 6:
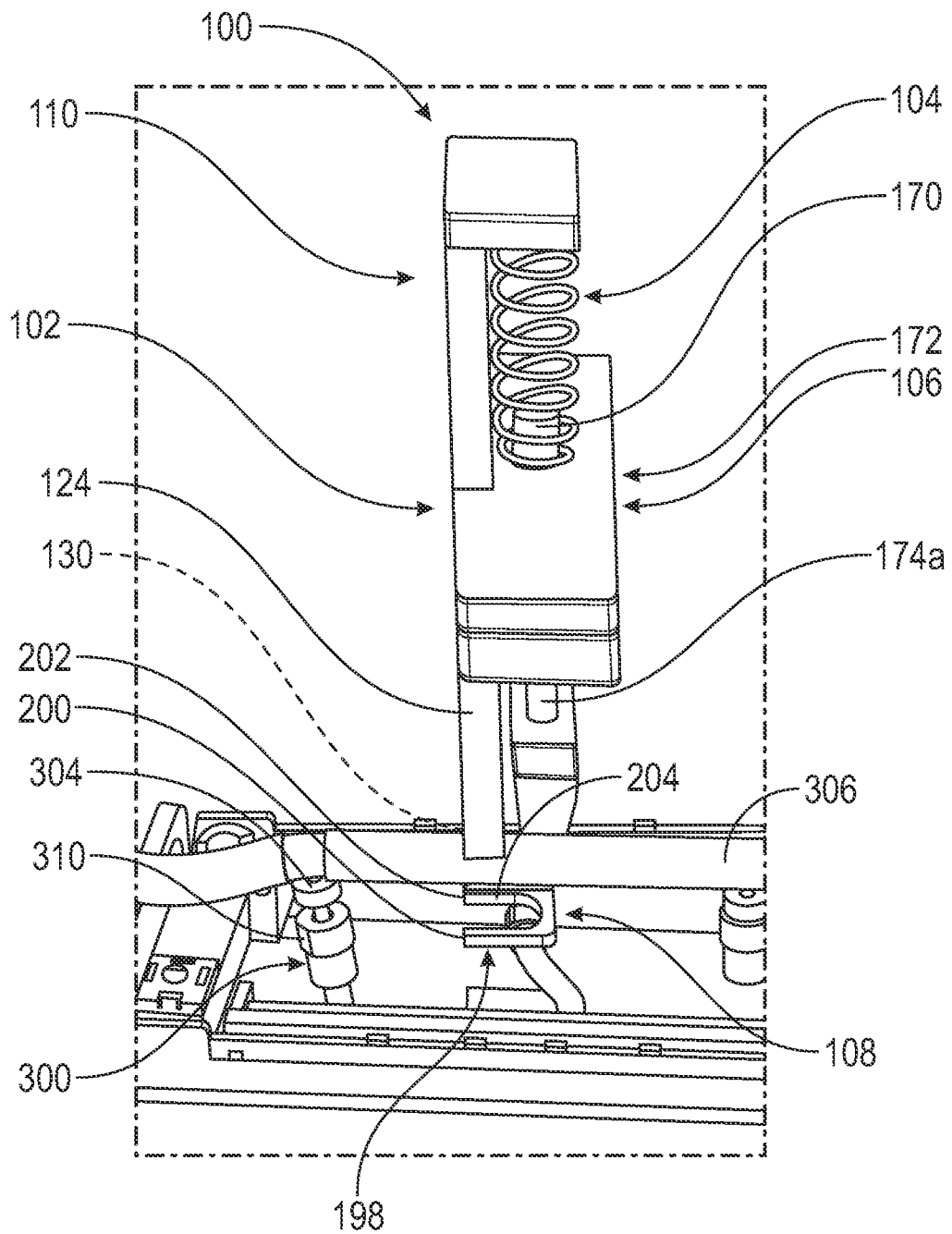
FIG. 6 is a schematic environmental illustration of the fluid fitting installation system in a first state and positioned proximate the first fluid fitting for coupling the first fluid fitting to the second fluid fitting.

With the fluid fitting installation system 100 assembled, with reference to FIGS. 5-7, FIG. 5 provides a method 400 of coupling the spigot 300 to the quick connect fitting 304 using the fluid fitting installation system 100. In this example, the spigot 300 is directly aligned beneath the quick connect fitting 304, and needs to be raised or lifted into engagement with the quick connect fitting 304 by the operator, but due to the clearance of the surrounding components, the operator is unable to reach the spigot 300 to engage the spigot 300 with the quick connect fitting 304. The method begins at 402 on FIG. 5. At 404, with the fluid fitting installation system 100 in the first state and the second handle 106 in the first position, the fluid fitting installation system 100 is positioned adjacent to or on a fluid line, such as the component fluid line 306 (FIG. 6). At 406, the fluid fitting installation system 100 is advanced along the component fluid line 306 (FIG. 6) by using the recess 130 of the first handle 102, for example, until the first claw arm 200 and the second claw arm 202 are positioned about the collar 310 of the spigot 300 and a portion of the spigot 300 is positioned within the opening 204 (FIG. 7). Stated another way, the fluid fitting installation system 100 is advanced on the component fluid line 306 (FIG. 6) until the claw 198 engages with the first fluid fitting or the spigot 300 and the claw 198 is positioned about a portion of a perimeter of the spigot 300. It should be noted that in certain examples, due to the size of the component fluid line 306, the fluid fitting installation system 100 may be inserted horizontally and then rotated 90 degrees to the position shown in FIG. 6 for placement along the component fluid line 306.

Figure 9:
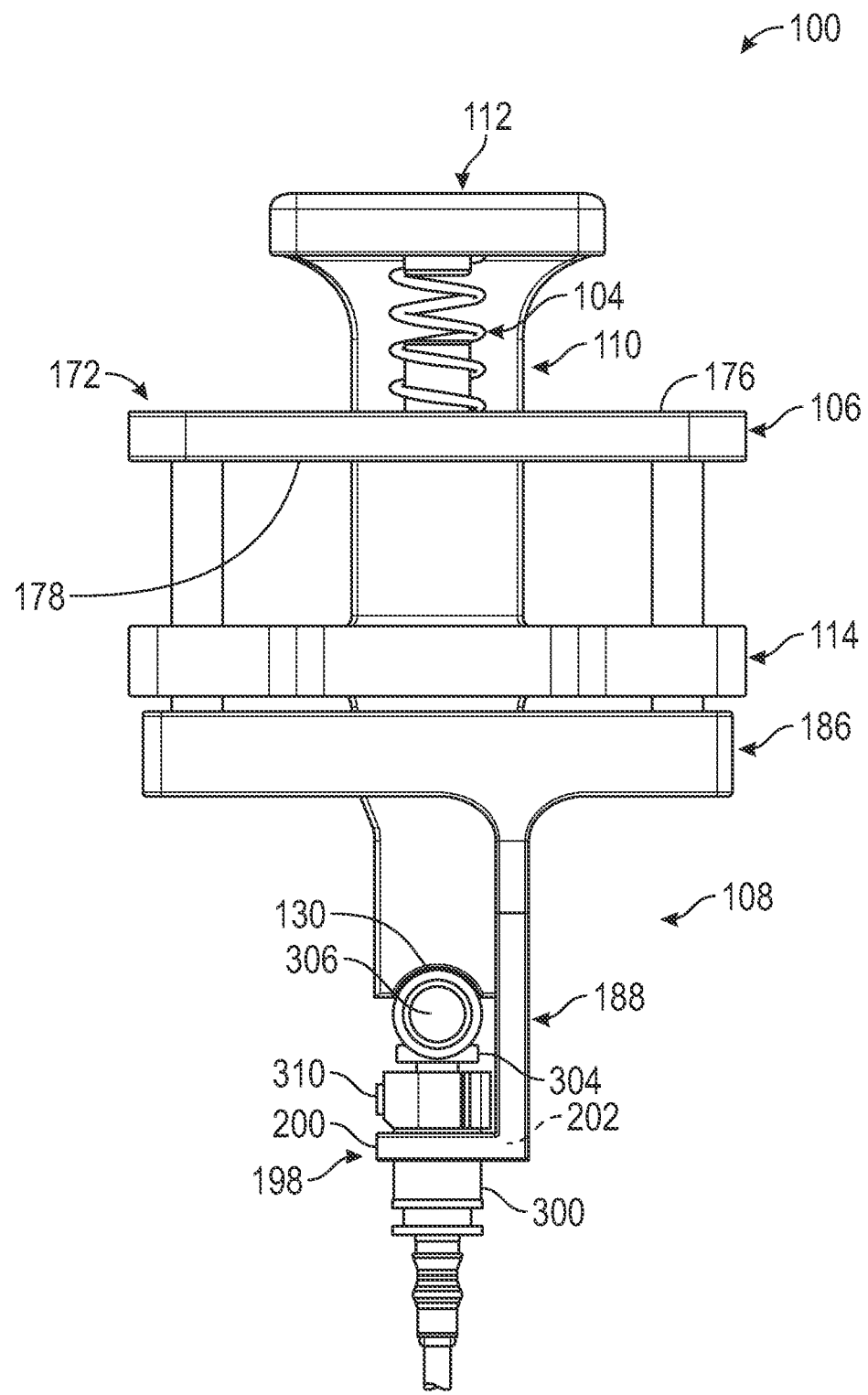
FIG. 9 is a schematic front view of the fluid fitting installation system in the second state and the first fluid fitting coupled to or installed onto the second fluid fitting.

With reference to FIGS. 5 and 7, with the spigot 300 coupled to the claw 198, at 408, with the operator's palm on the first flange 112, the operator's fingers grasps the second handle 106 by reaching into the notch 154 defined by the second flange 114, and lifts the second handle 106 by applying a force to the second handle surface 178 upward toward the first flange 112 of the first handle 102. Stated another way, the operator grasps the second handle 106 and moves the second handle 106 in the direction D from the first position (FIG. 7) to the second position (FIG. 9) such that the fluid fitting installation system 100 moves from the first state (FIG. 7) to the second state (FIG. 9). With reference to FIG. 9, as the second handle 106 moves from the first position to the second position, the grasping member 108, and thus, the claw 198 and the spigot 300 move with the second handle 106. This pulls or lifts the spigot 300 onto the quick connect fitting 304 to fluidly couple the spigot 300 to the quick connect fitting 304. At 410 of FIG. 5, once the second handle 106 has advanced such that the grasping base 186 contacts the second flange 114, the spigot 300 is fully secured and fluidly coupled to the quick connect fitting 304 (FIG. 9). The operator releases the second handle 106, and the force of the spring 104 moves or biases the second handle 106 back to the first position, returning the fluid fitting installation system 100 to the first state while the spigot 300 is fluidly coupled to the quick connect fitting 304, as shown in FIG. 1. The method ends at 412. It should be noted that the contact between the grasping base 186 and the second flange 114 (FIG. 9) in the second state provides both audible and tactile feedback to the operator that the spigot 300 is fluidly coupled to the quick connect fitting 304. In addition, or alternatively, one or more of the first handle 102 and the second handle 106 may include a marking, such as one or more lines, which visually indicate a position of the second handle 106 that corresponds to the fluid engagement and coupling of the spigot 300 to the quick connect fitting 304. Generally, the grasping base 186 and the second flange 114 define a range of movement for the second handle 106, which may be customized based on the amount of travel needed to engage the spigot 300 with the quick connect fitting 304. In one example, the second handle 106 moves about 30 millimeters (mm) in the direction D, compressing the spring 104, to engage the spigot 300 with the quick connect fitting 304.

Thus, the fluid fitting installation system 100 enables an operator to couple the spigot 300 to the quick connect fitting 304 with ease and in areas of reduced clearance. Further, the feedback provided by the fluid fitting installation system 100 ensures that the operator fully fluidly couples or engages the spigot 300 with the quick connect fitting 304. By using the first handle 102, which is spaced apart from the grasping member 108 by the second handle 106, the operator's hand is spaced apart from the spigot 300 and does not interfere with the coupling of the spigot 300 to the quick connect fitting 304. This enables tighter clearances between adjacent components, which may improve packaging within the vehicle. In addition, by additively manufacturing the first handle 102, the second handle 106 and the grasping member 108, the first handle 102, the second handle 106 and the grasping member 108 may be formed to correspond to the shape of the spigot 300 and also to the clearance available for the use of the fluid fitting installation system 100. This enables the fluid fitting installation system 100 to be customized to the particular environment. For example, the length of the aft section 124 of the first handle 102 may be adjusted along with a length of the handle legs 174a, 174b to provide additional clearance, if needed, between the operator's hand and the spigot 300. In addition, the grasping member 108, and the claw 198 of the grasping member 108, may be shaped differently to engage with spigots having different diameters, for example. Also, the amount of travel of the second handle 106 may be adjusted (by adjusting the position of the grasping base 186 and/or the second flange 114) to account for different travel lengths for coupling of the spigot 300 to the quick connect fitting 304. Generally, the use of the fluid fitting installation system 100 is to provide ergonomic insertion forces in tight clearance areas.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A fluid fitting installation system, comprising:
   a first handle including a body extending along a longitudinal axis from a proximal end to a distal end, a first flange at the proximal end, and a second flange between the proximal end and the distal end and defining at least one bore having a bore axis parallel to the longitudinal axis, wherein the distal end is formed with a fitting recess aligned with the longitudinal axis;
   a second handle movably coupled to the first handle and movably coupled to the second flange for linear movement along the longitudinal axis between a first position and a second position, wherein the second handle comprises a third flange located between the first flange and the second flange and at least one leg received within the at least one bore to movably couple the second handle to the first handle;
   a grasping member coupled to the second handle, the grasping member configured to be coupled to a first fluid fitting, and a movement of the second handle from the first position to the second position is configured to couple the first fluid fitting to a second fluid fitting while the second fluid fitting is received in the fitting recess; and
   a biasing member disposed between the first handle and the second handle, wherein the biasing member is configured to exert a force in a direction defined by the longitudinal axis.

2. The fluid fitting installation system of claim 1, wherein each of the first handle and the second handle includes a post extending along the longitudinal axis to guide the biasing member.

3. The fluid fitting installation system of claim 1, wherein the biasing member is configured to move the second handle from the second position to the first position.

4. The fluid fitting installation system of claim 1, wherein the grasping member includes a grasping base coupled to a grasping arm, and the grasping base is coupled to the second handle such that the grasping member moves with the second handle, wherein the grasping base is located between the grasping arm and the distal end of the first handle.

5. The fluid fitting installation system of claim 4, wherein the grasping arm includes a receiving structure configured to be positioned about the first fluid fitting, wherein the grasping arm extends from the grasping base to the receiving structure in a direction parallel to the longitudinal axis.

6. The fluid fitting installation system of claim 5, wherein the grasping arm is coupled to the grasping base such that the grasping arm is offset from the longitudinal axis and the receiving structure is aligned with the longitudinal axis.

7. A method for connecting fluid fittings, comprising:
   positioning the fluid fitting installation system of claim 1, with the second handle in the first position, adjacent to a fluid line including the second fluid fitting;
   receiving the second fluid fitting in the fitting recess;
   engaging the grasping member with the first fluid fitting; and
   moving the second handle from the first position to the second position to couple the first fluid fitting to the second fluid fitting.

8. The method of claim 7, wherein:
   the moving the second handle from the first position to the second position comprises a holding the proximal end of the first handle and pulling the third flange toward the proximal end.

9. The method of claim 8, further comprising:
   returning the second handle to the first position by releasing the second handle, wherein the biasing member pushes the third flange away from the proximal end of the first handle.

10. The method of claim 9, wherein the engaging the grasping member with the first fluid fitting further comprises:
    positioning the grasping member about a portion of a perimeter of the first fluid fitting.

11. The method of claim 7, wherein a grasping arm includes a receiving structure configured to be positioned about the first fluid fitting, wherein the grasping arm extends from a grasping base to the receiving structure in a direction parallel to the longitudinal axis, wherein the grasping arm is coupled to the grasping base such that the grasping arm is offset from the longitudinal axis and the receiving structure is aligned with the longitudinal axis.

12. A fluid fitting installation system, comprising:
    a first handle having a first flange and a second flange, wherein the second flange defines at least one bore defining a bore axis coincident with or parallel to a longitudinal axis of the fluid fitting installation system;
    a second handle movably coupled to the second flange of the first handle, the second handle movable relative to the first handle between a first position and a second position, wherein the second handle comprises a third flange located between the first flange and the second flange in the first position and in the second position, and the second handle includes at least one leg received within the at least one bore to movably couple the second handle to the first handle for linear movement along the axes;
    a grasping member coupled to the second handle, the grasping member including a grasping arm configured to be coupled to a first fluid fitting, the grasping arm extending along an axis offset from the longitudinal axis, and a movement of the second handle from the first position to the second position is configured to move the first fluid fitting in a retracting direction along the longitudinal axis to couple the first fluid fitting to a second fluid fitting; and
    a biasing member disposed between the first handle and the second handle to exert an axial force in a direction defined by the longitudinal axis, and each of the first handle and the second handle includes a post aligned with the longitudinal axis to guide the biasing member.

13. The fluid fitting installation system of claim 12, wherein the grasping member includes a receiving structure configured to be positioned about the first fluid fitting, and wherein all components of the fluid fitting installation system are located between a terminal surface of the first flange of the first handle and a terminal surface of the receiving structure.

14. The fluid fitting installation system of claim 13, wherein the grasping member includes a grasping base coupled to the grasping arm, the grasping base is coupled to the second handle to move with the second handle, the grasping arm extends in the direction of the longitudinal axis to a terminal end, and the receiving structure is located at the terminal end of the grasping arm.

15. The fluid fitting installation system of claim 14, wherein the grasping arm is offset from the longitudinal axis and the receiving structure is aligned with the longitudinal axis.

16. The fluid fitting installation system of claim 12, wherein the biasing member is configured to move the second handle from the second position to the first position.

17. The fluid fitting installation system of claim 12, wherein the grasping member includes a grasping base coupled to the grasping arm, and the grasping base is coupled to the second handle such that the grasping member moves with the second handle, wherein the grasping base is located between the grasping arm and a distal end of the first handle.

18. The fluid fitting installation system of claim 12, wherein the grasping arm includes a receiving structure configured to be positioned about the first fluid fitting, wherein the grasping arm extends from the grasping base to the receiving structure in a direction parallel to the longitudinal axis.

19. The fluid fitting installation system of claim 18, wherein the grasping arm is coupled to the grasping base such that the grasping arm is offset from the longitudinal axis and the receiving structure is aligned with the longitudinal axis.

* * * * *